US007227892B2

(12) United States Patent
Klein Gunnewiek et al.

(10) Patent No.: US 7,227,892 B2
(45) Date of Patent: Jun. 5, 2007

(54) METHOD AND DEVICE FOR GENERATING A SCALABLE CODED VIDEO SIGNAL FROM A NON-SCALABLE CODED VIDEO SIGNAL

(75) Inventors: Reinier Bernardus Maria Klein Gunnewiek, Eindhoven (NL); Wilhelmus Hendrikus Alfonsus Bruls, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 940 days.

(21) Appl. No.: 10/201,671

(22) Filed: Jul. 23, 2002

(65) Prior Publication Data

US 2003/0048283 A1    Mar. 13, 2003

(30) Foreign Application Priority Data

Jul. 26, 2001    (EP)    ................................. 01402029

(51) Int. Cl.
*H04B 1/66*    (2006.01)
(52) U.S. Cl. ................................. 375/240.08
(58) Field of Classification Search ............. 375/240.1, 375/240.11, 240.18, 240.19, 240.08; 382/248, 382/234; 725/101; *H04N 1/66*
See application file for complete search history.

(56) References Cited

U.S. PATENT DOCUMENTS

| | | | |
|---|---|---|---|
| 6,256,346 B1 * | 7/2001 | Yamaguchi et al. ... | 375/240.12 |
| 6,480,547 B1 * | 11/2002 | Chen et al. ............ | 375/240.27 |
| 6,792,044 B2 * | 9/2004 | Peng et al. ............ | 375/240.03 |
| 6,795,501 B1 * | 9/2004 | Zhu ....................... | 375/240.03 |
| 6,826,232 B2 * | 11/2004 | Chen et al. ............ | 375/240.18 |
| 2002/0090028 A1 * | 7/2002 | Comer et al. .......... | 375/240.2 |
| 2002/0118743 A1 * | 8/2002 | Jiang ..................... | 375/240.01 |
| 2002/0172279 A1 * | 11/2002 | Peng et al. ............ | 375/240.03 |
| 2003/0081673 A1 * | 5/2003 | Peng et al. ............ | 375/240.2 |
| 2003/0133499 A1 * | 7/2003 | Chen et al. ............ | 375/240.2 |
| 2004/0208247 A1 * | 10/2004 | Barrau et al. .......... | 375/240.27 |

OTHER PUBLICATIONS

Li et al, "Fine granularity scalability in MPEG-4 for streaming video", IEEE International Symposium on Circuits and Systems, vol. 1, pp. 299-302, May 2000.*
Gunnewiek et al, "A low-complexity MPEG-2 bit-rate transcoding algorithum", International Conference on Consumer Electronics, pp. 316-317, Jun. 2000.*
Sun et al, "Architectures for MPEG Compressed Bitstream Scaling", IEEE Transactions on Circuits and Systems for Video Technology, vol. 6, No. 2, pp. 191-199, Apr. 1996.*
Rene Klein Gunnewiek and Fons Brus, Jun. 2, 2001, "A low complexity algorithm to convert a non scalable to a scalable bit stream".

* cited by examiner

*Primary Examiner*—Tung Vo (57) ABSTRACT

The invention is a method of modifying data for obtaining a scalable video signal composed of a base video signal and a set of enhancement video signals from a non-scalable video signal. The method includes a set of attenuation steps applied to coefficients composing the non-scalable video signal, the attenuation steps being assembled in cascaded or in series for delivering the base video signal. The method further includes a re-encoding step associated with each one of said attenuation steps for delivering one of said enhancement video signals, from the coding error generated in each attenuation step.

13 Claims, 8 Drawing Sheets

METHOD AND DEVICE FOR GENERATING A SCALABLE CODED VIDEO SIGNAL FROM A NON-SCALABLE CODED VIDEO SIGNAL

FIELD OF THE INVENTION

The present invention relates to a method of modifying data for obtaining a scalable video signal from a non-scalable video signal, said scalable video signal being composed of a base video signal and a set of enhancement video signals.

The invention also relates to a product for carrying out said method. This invention may be used, for instance, in the field of video broadcasting or video storage.

BACKGROUND OF THE INVENTION

The MPEG-2 video standard is now a widespread standard since it is used in most applications implying digital video data manipulation, e.g. in the field of video broadcasting. For more flexibility, the so-termed scalability technique is advantageously used for simultaneously generating a base video signal coded in accordance with the MPEG-2 video standard, and a set of enhancement video signals of said base video signals. In particular, generating a scalable video signal can be used for adapting the bitrate to the communication channel bandwidth in suppressing or adding enhancement video signals to said scalable video signal. Said scalable video signal can be generated from an input video signal previously coded in accordance with the MPEG-2 video standard. To this end, a well known method consists of first decoding said input video standard for obtaining a decoded video signal, and secondly of re-encoding said decoded video signal by a scalable encoder for generating said scalable video signal.

OBJECT AND SUMMARY OF THE INVENTION

It is an object of the invention to provide a method of modifying data for obtaining a scalable video signal composed of a base video signal and a set of enhancement video signals from a non-scalable video signal, in a cost-effective manner.

To this end, the method of modifying data according to the invention is characterized in that it comprises:
a set of attenuation steps applied to coefficients composing said non-scalable video signal, said attenuation steps being assembled in series for delivering said base video signal,
a re-encoding step associated with each one of said attenuation steps for delivering one of said enhancement video signals, from the coding error generated in each attenuation step.

In a variant, the method of modifying data according to the invention is characterized in that it comprises:
a set of attenuation steps assembled in cascade, the attenuation step of a higher level in the cascade being applied to coefficients composing said non-scalable video signal for delivering said base video signal,
a re-encoding step associated with each one of said attenuation steps for delivering one of said enhancement video signals, from the coding error generated in each attenuation step of superior level in the cascade.

Contrary to the prior art method where the scalable video signal is generated from a decoded video signal, the method according to the invention directly generates said scalable video signal from a video signal coded in accordance with to the MPEG-2 video standard. Thus, expensive processing steps such as motion compensation and motion estimation performed in the prior art method are no longer needed in the method according to the invention.

The processing steps are directly performed on DCT (Discrete Cosine Transform) coefficients that compose the input coded video signal, and consist at least of attenuating their amplitude in order to generate a base video signal having a lower bitrate as compared with said input coded video signal. Attenuation consists of weighting steps and quantization steps of DCT coefficients, i.e. processing steps of low computational load. The attenuation steps can be assembled in series or cascaded, depending on the implemented hardware architecture chosen. Whatever the assembling steps chosen, the coding error of each attenuation step is re-encoded by a re-encoding step of low complexity in order to generate an enhancement video signal.

If attenuation steps are assembled in series, an enhancement video signal is generated from the coding error of each attenuation step. If attenuation steps are cascaded, an enhancement video signal results from the attenuation of a coding error generated by an attenuation step of superior level in the cascade.

The number of enhancement video signals can be easily increased by assembling, in cascade or in series, other attenuation and re-encoding steps. An output scalable signal of fine granularity can be obtained by generating a large set of enhancement video signals comprising video data of gradual quality. Thus, in associating said base video signal and a selected set of enhancement video signals, a given total bitrate target can be reached, also of a given quality.

The invention relates to a first product for modifying data for obtaining a scalable video signal from a non-scalable video signal, said scalable video signal being composed of a base video signal and a set of enhancement video signals. This first product is characterized in that it comprises:
a set of attenuation means applied to coefficients composing said non-scalable video signal, said attenuation means being assembled in series for delivering said base video signal,
re-encoding means associated with each one of said attenuation means for delivering one of said enhancement video signals, from the coding error generated by each attenuation means.

The invention relates to a second product for modifying data for obtaining a scalable video signal from a non-scalable video signal, said scalable video signal being composed of a base video signal and a set of enhancement video signals. This second product is characterized in that it comprises:
a set of attenuation means assembled in cascade, attenuation means of a higher level in the cascade being applied to coefficients composing said non-scalable video signal for delivering said base video signal,
re-encoding means associated with each one of said attenuation means for delivering one of said enhancement video signals, from the coding error generated by each attenuation means of superior level in the cascade.

The first and second video products according to the invention comprises software and hardware means for implementing the different steps of the method described above. Such product may correspond to video broadcast or video streaming equipment, or to consumer products such as a set-top box or a Digital Video Disc (DVD) players.

The invention also relates to a coded video signal comprising a base video signal and a set of at least one enhancement video signal, said coded video signal resulting from an implementation of the steps and sub-steps of the method of modifying data in an input coded video signal according to the invention.

This scalable signal reflects the technical characteristics of steps and sub-steps of the method according to the invention.

The invention also relates to a storage medium having stored thereon a coded video signal, said coded video signal comprising a base layer and a set of enhancement layers, said coded video signal resulting from an implementation of the method of modifying data in an input coded video signal according to the invention.

The storage medium may preferably correspond to a hard disk or to an erasable digital video disk (e.g. R/W disc).

The invention also relates to a computer program comprising code instructions for implementing the steps and sub-steps of the method according to the invention.

This computer program comprises a set of instructions which, when loaded into hardware means such as a memory connected to a signal processor, allows to carry out any steps and sub-steps of the method according to the invention.

Detailed explanations and other aspects of the invention will be given below.

BRIEF DESCRIPTION OF THE DRAWINGS

The particular aspects of the invention will now be explained with reference to the embodiments described hereinafter and considered in connection with the accompanying drawings, in which identical parts or sub-steps are designated in the same manner.

DETAILED DESCRIPTION OF THE INVENTION

This invention is well adapted to the data modification of MPEG-2 input coded video signals, but it will be apparent to a person skilled in the art that such a method is applicable to any coded signal that has been encoded with a block-based compression method such as, for example, the one described in MPEG-4, H.261 or H.263 video standards.

The invention will herein after be described in detail, assuming that the input coded video signal to be modified complies with the MPEG-2 international video standard (Moving Pictures Experts Group, ISO/IEC 13818-2). It is assumed that DCT coefficients composing a coded video frame are grouped in 8*8 blocks representing a frequency spectrum in two dimensions, called DCT blocks.

Figure 1:
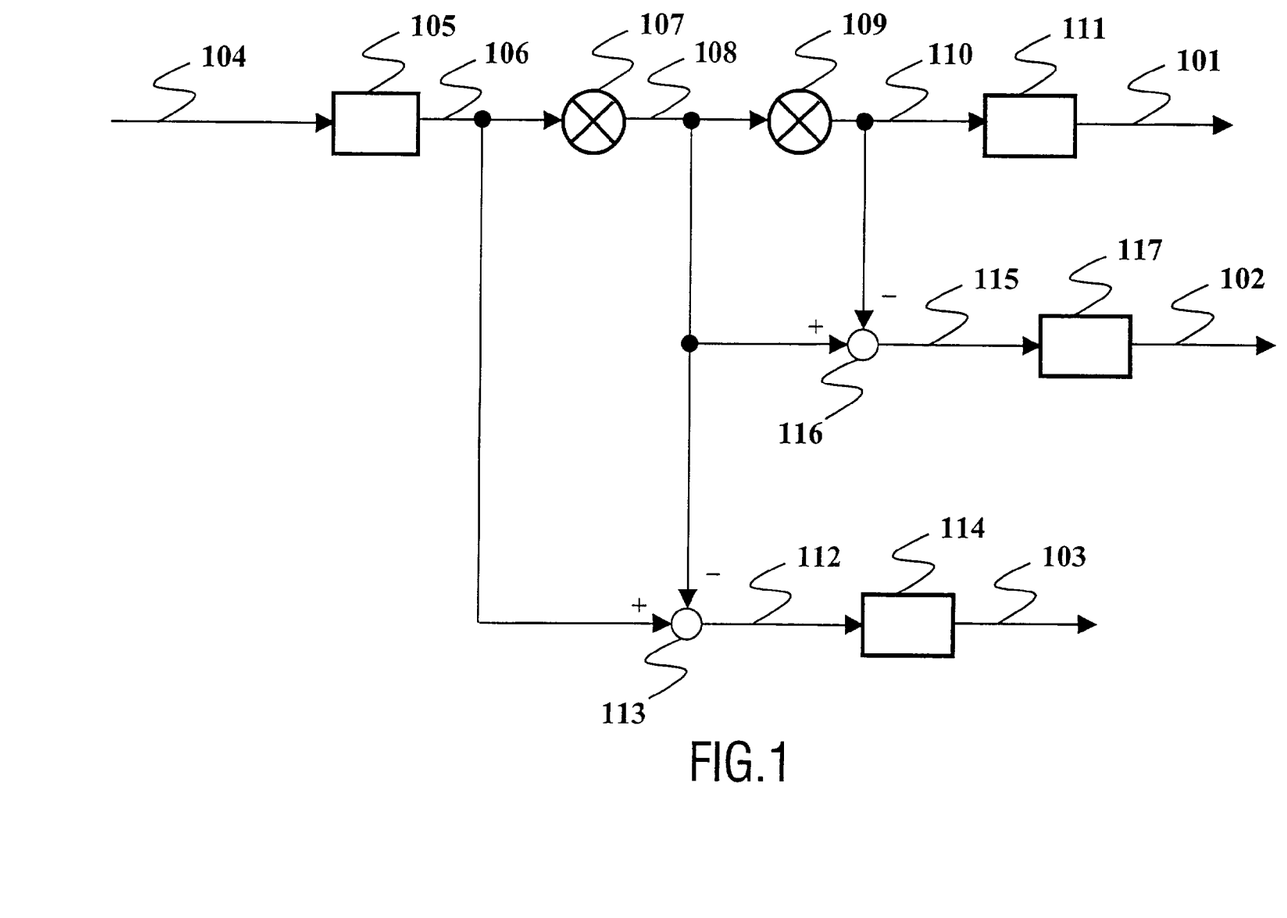
FIG. 1 depicts a first arrangement of the method according to the invention.

FIG. 1 depicts a first arrangement of the method according to the invention. This arrangement allows generation of a scalable video signal composed of a base video signal 101 and two enhancement video signals 102 and 103, from an input coded video signal 104.

This arrangement comprises a variable length decoding step 105 applied to DCT coefficients composing signal 104, consisting of in an entropy decoding (e.g. by means of an inverse look-up table of Huffman codes) for obtaining decoded DCT coefficients carried by signal 106. Said coefficients carried by signal 106 are attenuated by attenuation step 107 that delivers attenuated DCT coefficients carried by signal 108. Attenuation step 107 is performed by a 8*8 weighting matrix multiplied to DCT blocks, each DCT coefficient being thus multiplied by a weighting factor in said matrix, the result of each multiplication being rounded to the nearest integer. Weighting matrixes are filled by values whose amplitudes are between 0 and 1, set for example to non-uniform values close to 1 for low frequency values, and close to 0 for high frequency values, or to uniform values so that all coefficients in a 8*8 DCT block are equally attenuated. In series with attenuation step 107, another attenuation step 109 attenuates the amplitude of DCT coefficients carried by signal 108 in a similar way as step 107 and delivers new attenuated coefficients carried by signal 110, which are variable length coded by step 111 for generating said base video signal 101. Similarly to VLD processing, VLC processing consists of a look-up table for defining a Huffman code to each coefficient 110.

The assembling operation in series of attenuation steps 107 and 109 allows generation of enhancement video signals 102 and 103 in re-encoding each coding error resulting from these two attenuation steps. The coding error 112 relative to attenuation step 107 is generated in subtracting signal 108 from signal 106 in a of subtracting sub-step 113. The coding error 112 is then variable-length coded in step 114 for generating said enhancement video signal 103. The coding error 115 relative to attenuation step 109 is generated by subtracting signal 110 from signal 108 in a subtracting sub-step 116. The coding error 115 is then variable-length coded in step 117 for generating said enhancement video signal 102.

The content of enhancement video signals 102 and 103 can be set by acting on the attenuation level of each attenuation step 107 and 109. Indeed, if a light attenuation is performed in step 107, enhancement video signal 103 comprises data of fine details, and if an important attenuation is performed in step 109, enhancement video signal comprises data of coarser details. Thus, the output scalable signal generated by this arrangement is composed of video layers having different qualities: the base video signal 101 of coarse quality, an enhancement video signal 102 comprising data of medium quality, and an enhancement video layer comprising data of fine details. In accordance with to the available bandwidth on which said scalable video signal is sent, the base video signal can be sent with a varying number of enhancement video signals. For example, if there are no bandwidth limitations, the base video signal can be sent with signals 102 and 103. In that case, said scalable signal has the same quality as the video quality of input signal 104. If there are bandwidth limitations, the base video signal can be sent with only signal 102. In that case, only a degraded version of input signal 104 can be sent.

Figure 2:
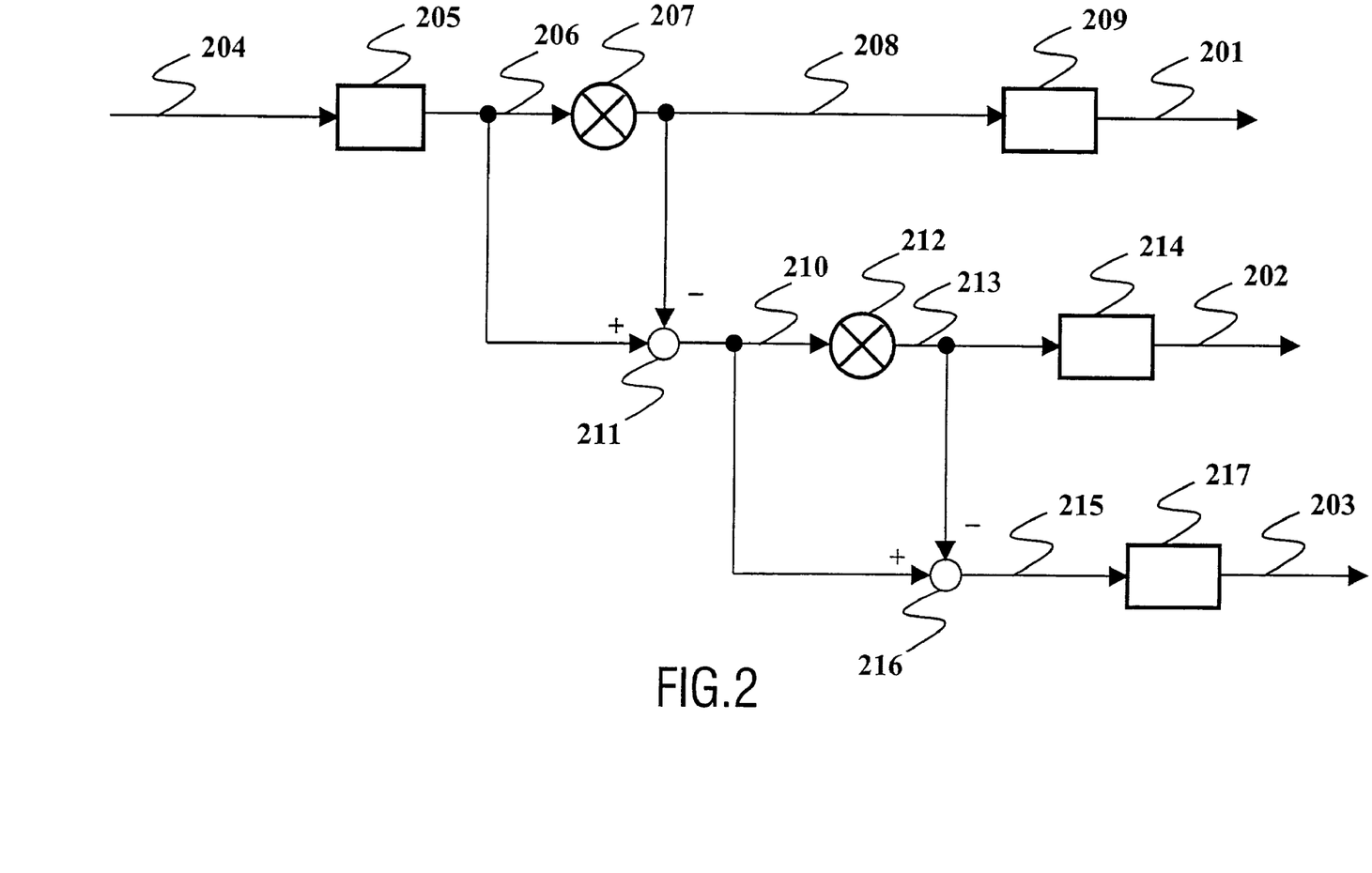
FIG. 2 depicts a second arrangement of the method according to the invention.

FIG. 2 depicts a second arrangement of the method according to the invention. This arrangement allows generation of a scalable video signal composed of a base video signal 201 and two enhancement video signals 202 and 203, from an input coded video signal 204. This arrangement differs from that in FIG. 1 in that attenuation steps are assembled in cascade.

This arrangement comprises a variable length decoding step 205 applied to DCT coefficients composing signal 204 and delivering variable length decoded DCT coefficients carried by signal 206. The attenuation step 207 of higher level in the cascade attenuates, in a similar way as depicted in FIG. 1, DCT coefficients of signal 206 for delivering attenuated DCT coefficients 208 that are variable-length coded in step 209 for generating said base video signal 201. The coding error 210 relative to attenuation step 207 of superior level in the cascade is generated by subtracting signal 208 from signal 206 in a of subtracting sub-step 211. The coefficients composing said coding error 210 are then attenuated in attenuation step 212 for generating attenuated coefficients 213 that are then variable-length coded in step 214 for delivering said base video signal 202. The coding error 215 relative to attenuation step 212 is generated by subtracting signal 213 from signal 210 in a subtracting sub-step 216. The coding error 215 is then variable-length coded in step 217 for generating said enhancement video signal 203. It should be noted that no attenuation step is performed on coding error 215 contrary to coding error 210, so that the scalable signal has the same quality as the signal 204 if all enhancement video signals 202 and 203 are sent with said base video signal 201.

Similarly to explanations given with reference to FIG. 1, the attenuation level of steps 207 and 212 determines the content of signals 201-202 and 203. For example, an important attenuation in step 207 leads to a base video signal 201 comprising coarse details, and a medium attenuation in step 212 leads to an enhancement video signal 202 comprising medium details, the enhancement video signal 203 comprising data of finest details.

Figure 3:
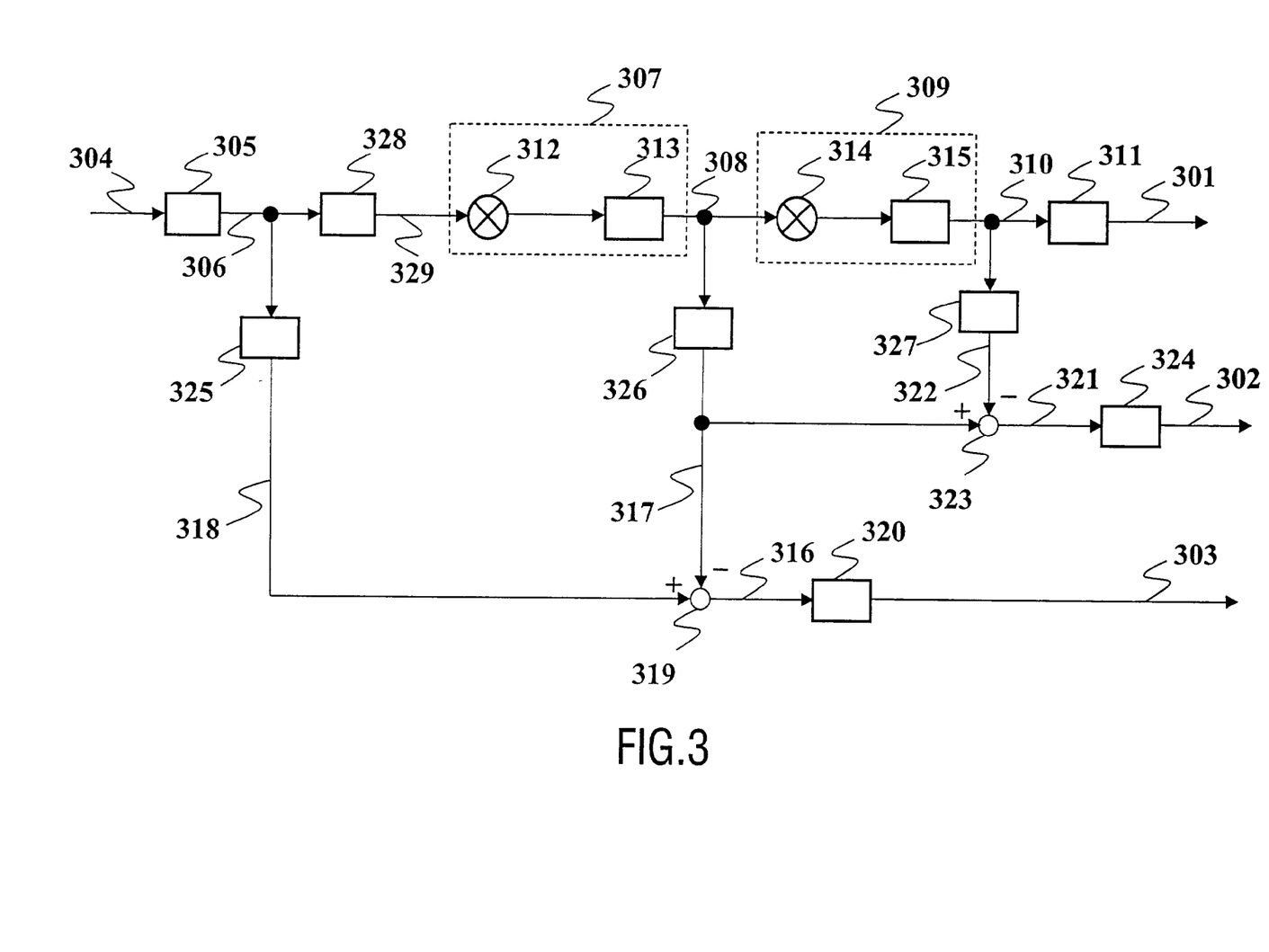
FIG. 3 depicts a third arrangement of the method according to the invention.

FIG. 3 depicts a third arrangement of the method according to the invention. This arrangement allows generation of a scalable video signal composed of a base video signal 301 and two enhancement video signals 302 and 303, from an input coded video signal 304. This arrangement is similar to that shown in FIG. 1 in the sense that attenuation steps are assembled in series but differs in that the attenuation is performed in a different manner.

This arrangement comprises a variable length decoding step 305 applied to DCT coefficients composing signal 304 and delivering variable length decoded DCT coefficients carried by signal 306. Said coefficients carried by signal 306 are first inverse quantized in a step 328 that delivers inverse quantized DCT coefficients carried by signal 329, said signal 329 being then attenuated in an attenuation step 307 that delivers attenuated DCT coefficients carried by signal 308. In series with attenuation step 307, another attenuation step 309 attenuates the amplitude of DCT coefficients carried by signal 308 and delivers new attenuated coefficients carried by signal 310, that are variable length coded in a step 311 for generating said base video signal 301. Similarly to VLD processing, VLC processing consists of a look-up table for defining a Huffman code to each coefficients 310.

Attenuation steps 307 (and 309 respectively) are composed of a weighting step 312 (and 314 respectively) followed in series by a quantization step 313 (315 respectively). Weighting steps 312 and 314 are performed by a 8*8 weighting matrix multiplied to DCT blocks, each DCT coefficient being thus multiplied by a weighting factor in said matrix, the result of each multiplication being rounded to the nearest integer, weighting matrixes being filled by values whose amplitudes are between 0 and 1, set for example to non-uniform values close to 1 for low frequency values and close to 0 for high frequency values, or to uniform values so that all coefficients in a 8*8 DCT block are equally attenuated. Quantization step 313 (315 respectively) consists of dividing weighted DCT coefficients by a new quantization factor for delivering quantized DCT coefficients 308 (310 respectively), said quantization factor being the same for all coefficients of all 8*8 blocks composing a macroblock (MB).

The coding error 316 relative to attenuation step 307 is generated by subtracting signal 317 from signal 318 in a of subtracting sub-step 319, said signal 318 resulting from the inverse quantization step 325 of signal 306, and said signal 317 resulting from the inverse quantization step 326 of signal 308. The coding error 316 is then variable-length coded by step 320 for generating said enhancement video signal 303. The coding error 321 relative to attenuation step 309 is generated by subtracting signal 322 from signal 317 in a of subtracting sub-step 323, said signal 322 resulting from the inverse quantization step 327 of signal 310. The coding error 321 is then variable length coded by step 324 for generating said enhancement video signal 302.

Quantized coefficients composing signal 306 are inverse quantized in step 325 by multiplying their value by the factor used for the quantization of primary non-quantized coefficients (not depicted in the Figure), quantized coefficients composing signal 317 are inverse quantized in step 326 by multiplying their value by the factor used in quantization step 307, while quantized coefficients composing signal 322 are inverse quantized by multiplying their value by the factor used in quantization step 315.

The content of enhancement video signals 302 and 303 can be set by acting on the attenuation level of each attenuation step 307 and 309 similarly to FIG. 1, either by acting on the weighting steps 312 and 314 and/or by acting on quantization steps 313 and 315.

In that arrangement, it can be noticed that for signal 318 can be directly taken at the output of step 328 for decreasing the computational load.

Figure 4:
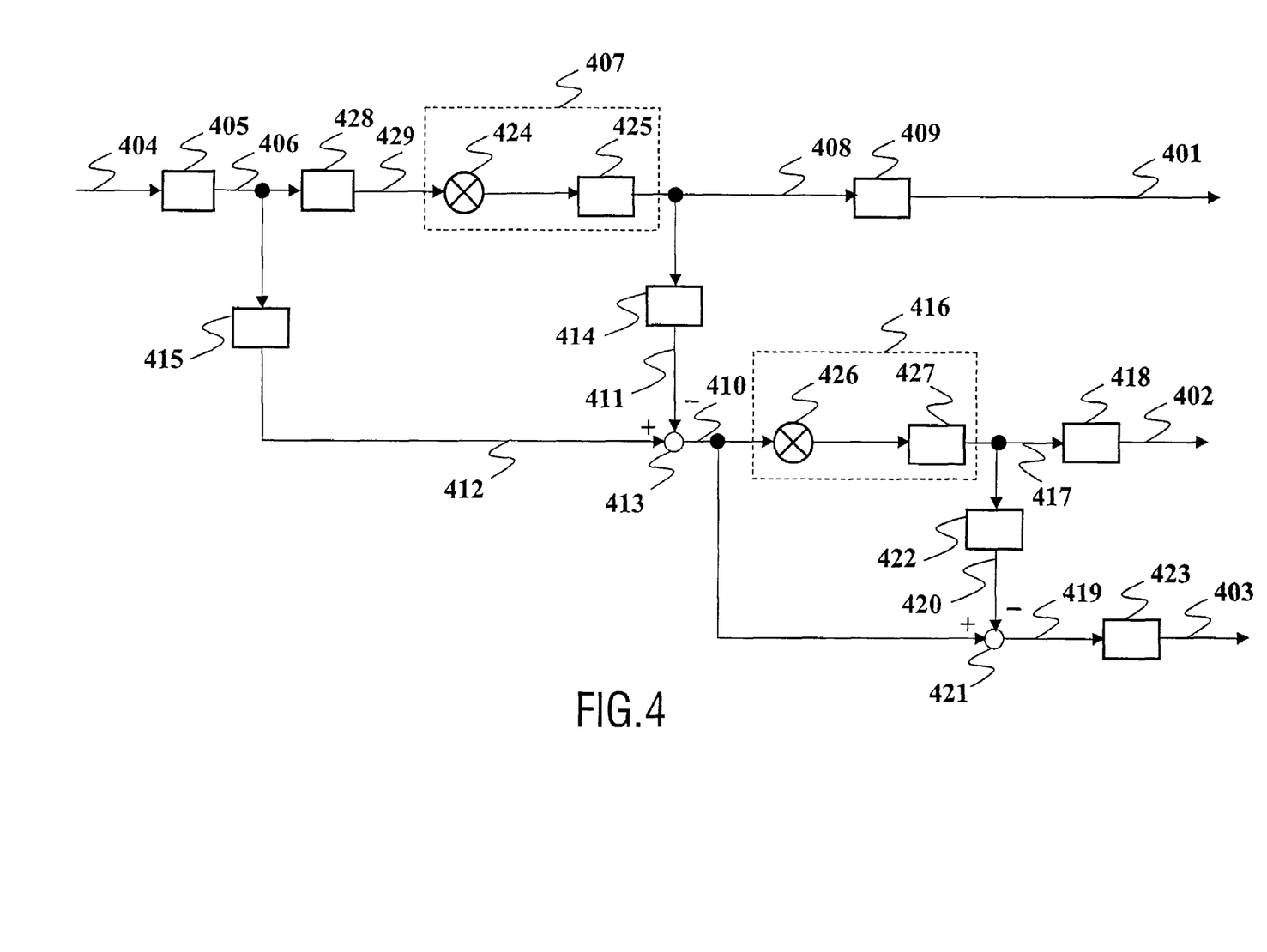
FIG. 4 depicts a fourth arrangement of the method according to the invention.

FIG. 4 depicts a fourth arrangement of the method according to the invention. This arrangement allows generation of a scalable video signal composed of a base video signal 401 and two enhancement video signals 402 and 403, from an input coded video signal 404. This arrangement differs from that in FIG. 3 in that attenuation steps are assembled in cascade.

This arrangement comprises a variable length decoding step 405 applied to DCT coefficients composing signal 404 and delivering variable-length decoded DCT coefficients carried by signal 406. Said coefficients carried by signal 306 are first inverse quantized in a step 428 that delivers inverse quantized DCT coefficients carried by signal 429. The attenuation step 407 of higher level in the cascade attenuates, in a similar way as depicted in FIG. 3, DCT coefficients of signal 429 for delivering attenuated DCT coefficients 408 that are variable length coded in 409 for generating said base video signal 401. The coding error 410 relative to attenuation step 407 of superior level in the cascade is generated by subtracting signal 411 from signal 412 in a subtracting sub-step 413, said signal 411 resulting from the inverse quantization step 414 of signal 408, and said signal 412 resulting from the inverse quantization step 415 of signal 406. The coefficients composing said coding error 410 are then attenuated in attenuation step 416 for generating attenuated coefficients 417 that are then variable-length coded in step 418 for delivering said base video signal 402. The coding error 419 relative to attenuation step 416 is generated by subtracting signal 420 from signal 410 in a subtracting sub-step 421, said signal 420 resulting from the inverse quantization step 422 of signal 417. The coding error 419 is then variable length coded in step 423 for generating said enhancement video signal 403. It should be noted that no attenuation step is performed on coding error 419 contrary to coding error 410, so that the scalable signal has the same quality as the signal 404 if all enhancement video signals 402 and 403 are sent with said base video signal 401.

Similarly to explanations given with reference to FIG. 1, attenuation step 407 (and 416 respectively) are composed by weighting steps 424 (and 426 respectively) followed in series by quantization steps 425 (and 427 respectively), and the attenuation level of steps 407 and 416 determines the content quality of signals 401-402 and 403.

In that arrangement, it can be noticed that for signal 412 can be directly taken at the output of step 428 for decreasing the computational load.

Figure 5A:
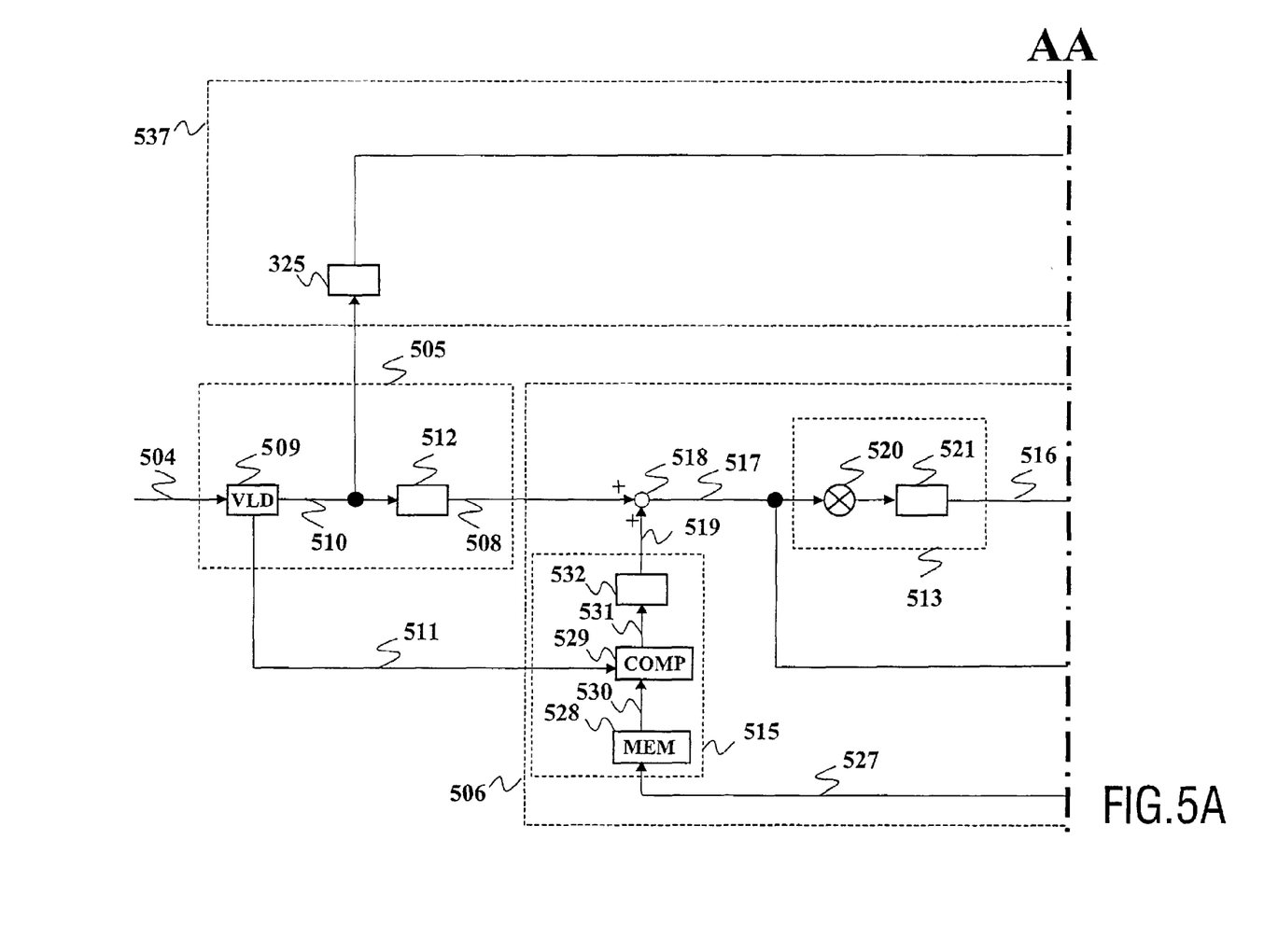
FIG. 5A and FIG. 5B depicts a fifth arrangement of the method according to the invention, FIG. 6A
Figure 5B:
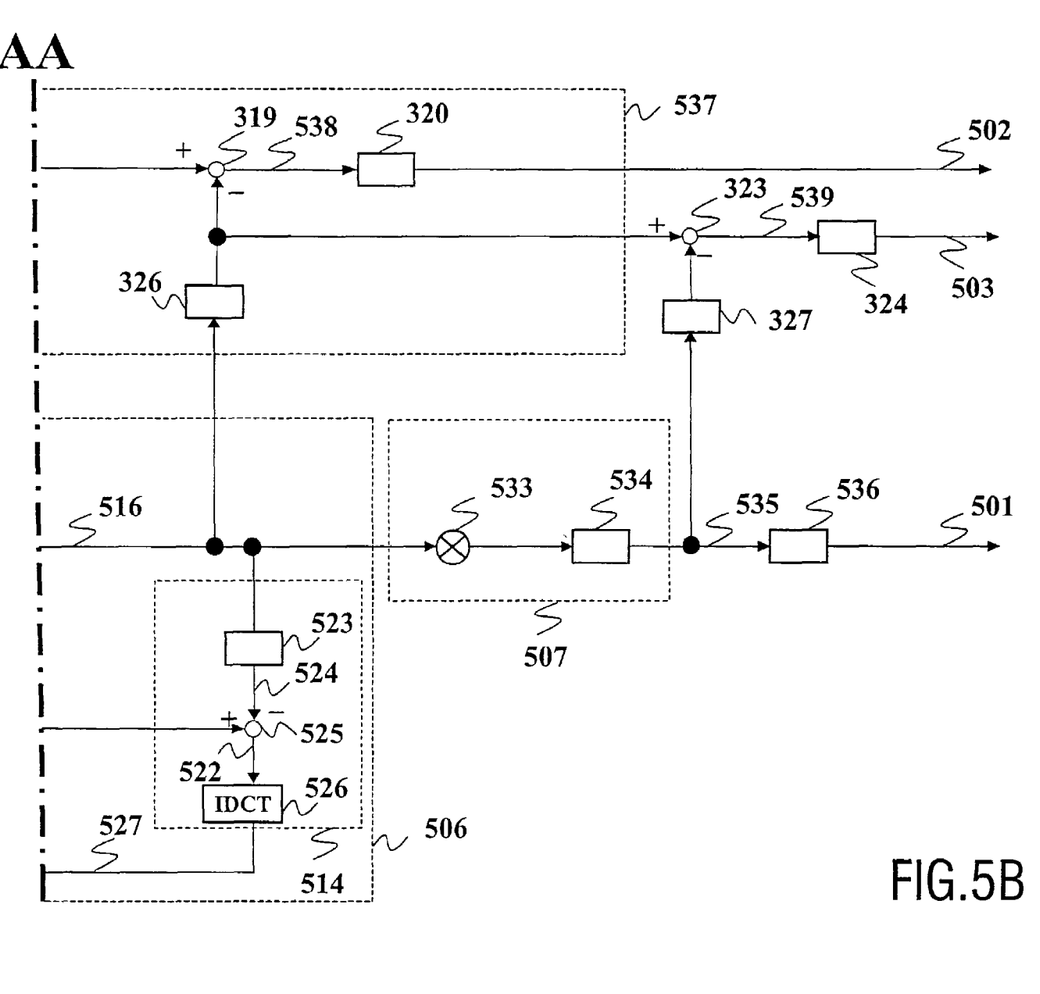

FIG. 5A and FIG. 5B (forming FIG. 5 by assembling) depict a fifth arrangement of the method according to the invention. This arrangement allows generation of a scalable video signal composed of a base video signal 501 and two enhancement video signals 502 and 503, from an input coded video signal 504.

The arrangement of FIG. 5 differs from that in FIG. 3 in that the attenuation step 307 is replaced by a transcoding arrangement 506.

Processing step 505 is an error decoding step for delivering a decoded data signal 508 from the input coded video signal 504. This error decoding step 505 performs a partial decoding of the input video signal 504 because only a reduced number of data type comprised in said input signal is decoded. This step comprises a variable length decoding 509 of at least DCT coefficients and motion vectors in signal 504. This step 509 consists of an entropy decoding, e.g. by means of an inverse look-up table of Huffman codes, allowing decoded DCT coefficients 510 and motion vectors 511 to be obtained. In series with said step 509, an inverse quantization 512 is performed on said decoded coefficients 510 for delivering said decoded data signal 508. The inverse quantization 512 consists of multiplying said DCT decoded coefficients 510 by a quantization factor in said input signal 504. In most cases, this inverse quantization 512 is performed at the macroblock level because said quantization factor may change from one macroblock to another. The decoded signal 508 is in the frequency domain.

Processing step 506 can be decomposed in processing steps 513-514-515. Processing step 513 is an attenuation step delivering an output video signal 516 corresponding to the signal resulting from the transcoding of said input video signal 504, said signal 516 being compliant with the MPEG-2 video standard. Said re-encoding 513 acts on an intermediate data signal 517 which results from the addition, by means of the adding sub-step 518, of said decoded data signal 508 to a motion compensated signal 519. Said attenuation step 513 comprises in series a weighting step 520 followed in series by a quantization step 521, both acting on DCT coefficients of signal 517 as described in the above Figures. The quantization step 521 consists of dividing attenuated DCT coefficients by a new quantization factor, for delivering quantized DCT coefficients 516. Such a new quantization factor characterizes the modification performed by the transcoding of said input coded video signal 504, as for example a larger quantization factor than the one used in step 512 for inverse quantizing coefficients of signal 510 may result in a bitrate reduction of said input coded video signal 504. Processing step 514 is a reconstruction step for delivering the coding error 522 of signal 516 in the frequency domain. This reconstruction step 514 allows generating of the coding error introduced by the attenuation step 513. Such a coding error of a current transcoded video frame is taken into account, during a motion compensation step herein after described in detail, for transcoding the next video frame so as to avoid quality drift from frame to frame in signal 516. Said coding error 522 is reconstructed by means of an inverse quantization 523 performed on coefficients of signal 516, resulting in signal 524. A subtracting sub-step 525 is then performed between signals 517 and 524, resulting in said coding error 522 in the DCT domain, i.e. in the frequency domain. Thus, the coding error 522 corresponds to the difference between said input coded video signal 504 and said signal 516. Said coding error 522 in the frequency domain is passed through an inverse discrete cosine transform 526 for generating the corresponding coding error 527 in the pixel domain. Processing step 515 is a motion compensation step for delivering a motion compensated signal 519, from a coding error stored in memory 528 and relative to a previous transcoded video frame. Memory 528 comprises at least two sub-memories: the first is dedicated to the storage of the coding error relative to a video frame being transcoded, and the second is dedicated to the storage of the coding error relative to a previous transcoded video frame. First, a motion compensation 529 is done in a prediction step performed on the content of said second sub-memory accessible by signal 530. The prediction step consists of calculating a predicted signal 531 from said previously stored coding error: the predicted signal, also called motion compensated signal, corresponds to the part of the signal stored in said memory device 528 that is pointed by the motion vector 511 relative to the part of the input video signal 508 being transcoded. As is well known to those skilled in the art, said prediction is usually performed at the macroblock (MB) level, which means that for each input MB carried by signal 508, a predicted MB is determined and further added by adding sub-step 518 in the DCT domain to said input MB for attenuating quality drift from frame to frame. As motion compensated signal 531 is in the pixel domain, it is passed through a DCT step 532 for generating said primary motion compensated signal 519 in the DCT domain.

In series with said attenuation step 513, another attenuation step 507 is performed on coefficients composing signal 516. This attenuation step 507 is composed of a weighting step 533 followed in series with a quantization step 534 delivering signal 535. In series with said quantization 534, a variable length coding 536 is applied on coefficients composing signal 535 for obtaining entropy coded DCT coefficients composing signal 501.

The assembly of processing steps 505-506 and 507 allows generation of the base video signal 501 of a decreased bitrate as compared with signal 504, i.e. of coarser quality, and also generation of intermediate signals 510-516-535 of different qualities in order to generate enhancement video signals 502 and 503 in processing step 537. To this end, processing step 537 is composed of the majority of processing steps as depicted in FIG. 3. In particular, FIG. 5 differs from FIG. 3 in that signals 306-308-310 (510-516-535 respectively) are generated in a different manner as compared with FIG. 5. Thus, enhancement video signal 502 is generated by re-encoding a signal 538 corresponding to the coding error generated by transcoding signal 504, while enhancement video signal is generated by re-encoding a signal 539 corresponding to the coding error generated by attenuating signal 516.

In a variant of this arrangement, it can be envisaged to suppress steps 325 and 326 and directly pick up signals 508 and 524 for generating signals 538 and 539 in a cost-effective manner.

It should be noted that the quantization factor used in step 534 must at least be larger than the quantization factor used in step 521.

Figure 6A:
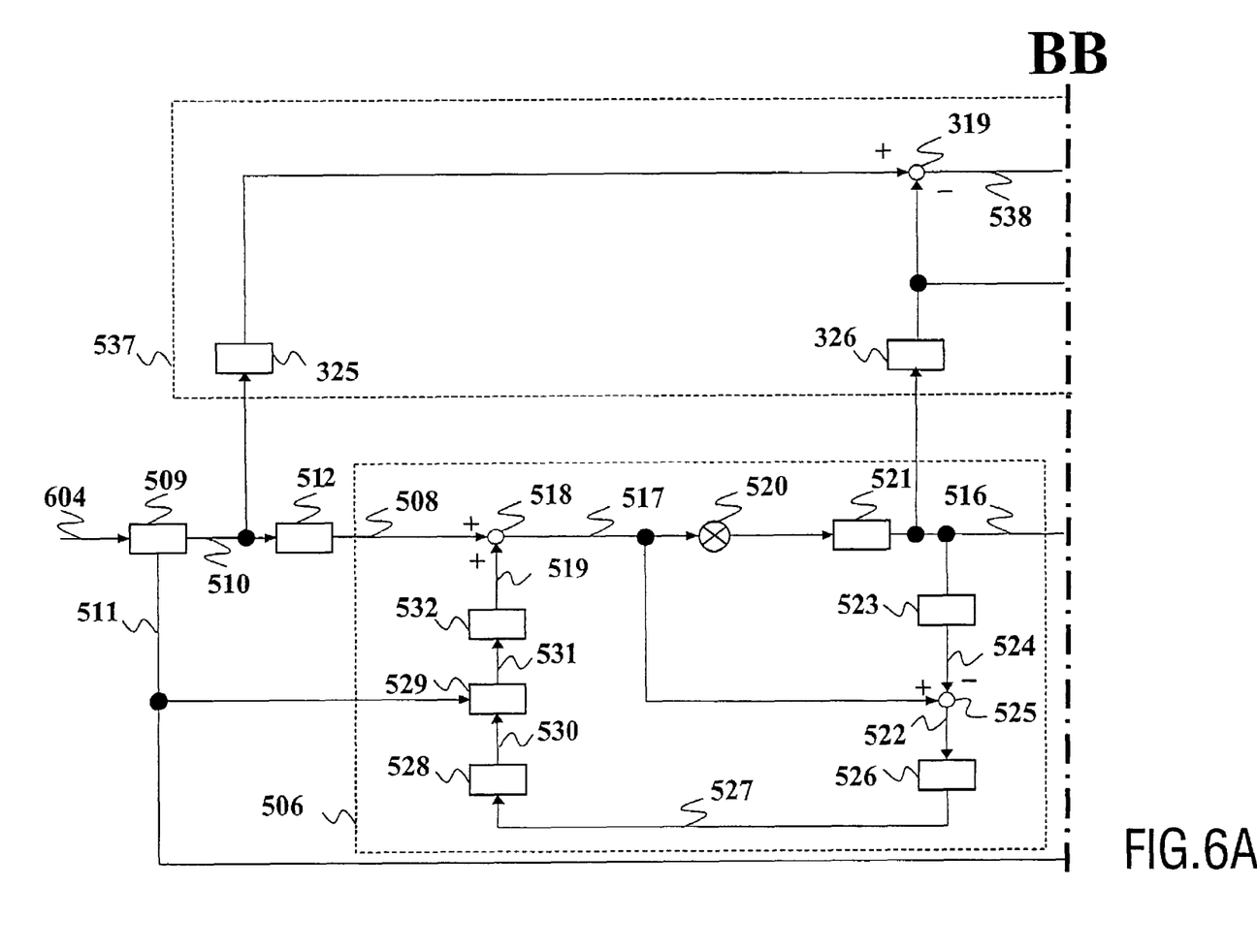
Figure 6B:
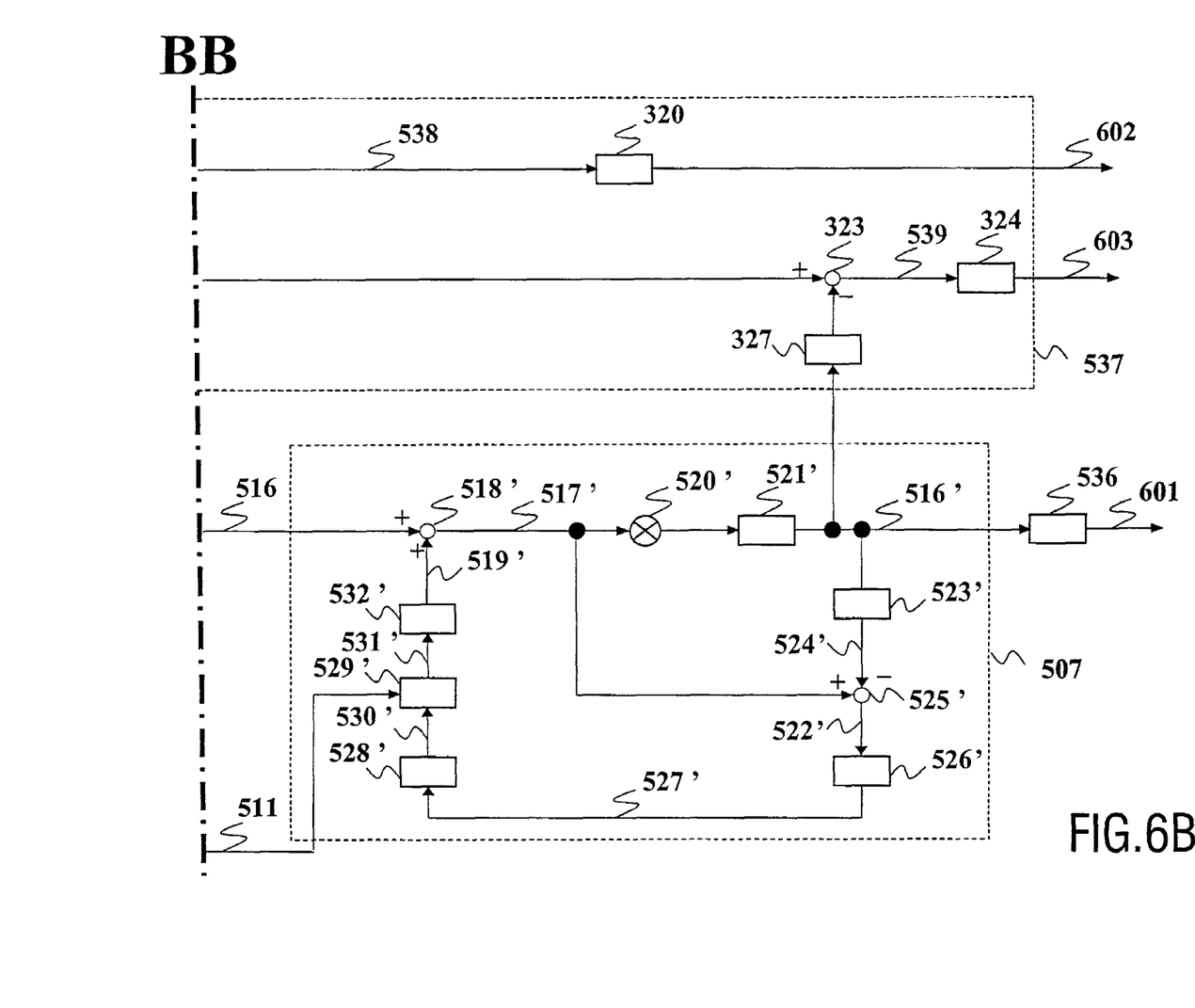
FIG. 6B depicts a sixth arrangement of the method according to the invention.

FIG. 6A and FIG. 6B (forming FIG. 6 by assembling) depict a sixth arrangement of the method according to the invention. This arrangement allows generation of a scalable video signal composed of a base video signal 601 and two enhancement video signals 602 and 603, from an input coded video signal 604. This arrangement differs from that in FIG. 5 in that processing step 507 no longer corresponds to an attenuation step but to a transcoding step similar to processing step 506. This transcoding step 507 generates an output signal 535 from input signal 516, said signal 535 having a decreased bitrate as compared with signal 516. In comparison with FIG. 5, the transcoding step 507 prevents quality drift on the base video signal 501 because the coding error of said transcoding 507 is motion-compensated.

Arrangements have been depicted by considering that the scalable video signal generated by the method according to the invention is composed of a base video signal and two enhancement video signals. Of course, the method according to the invention is not restricted to this reduced number of enhancement video signals, and a larger set of enhancement video signals could be obtained in inserting additional attenuation and re-encoding steps either in series or in cascade.

Moreover, the method according to the invention, allowing generation of a scalable video signal from a non-scalable video signal, only acts on the value of DCT coefficients composing said non-scalable video signal, and the value of quantization factors. In particular, it means that both motion vectors and the picture type of the input non-scalable video signal are not modified.

The invention can be applied to any non-scalable video signal coded in accordance with a block-based technique, either generated by a MPEG-2 encoder or transcoder, or other MPEG-based video data manipulation devices.

This method of modifying data according to the invention can be implemented in a product in different contexts.

Such a product may correspond to video broadcast or video streaming equipment. In this context, an input video signal coded in accordance with the MPEG-2 video standard can be sent after processing through communication channels having different bandwidth capacities by associating a variable number of enhancement video signals with the base video signal.

Such a product may also correspond to consumer products such as a set-top box or a Digital Video Disc (DVD). In this context, after processing of an input video signal coded in accordance with the MPEG-2 video standard, the base video signal and its associated enhancement video signals are locally stored in memory means. Then, in the case of a lack of memory space, one or a plurality of enhancement video signals can be removed from said memory means without suppressing the totality of the video sequence. This product is particularly dedicated to elastic storage application.

This method of modifying data in an input coded video signal can be implemented in several manners in a product. Using hardware components, this scalable method can be implemented by means of wired electronic circuits (RAM memories for VLC and VLD look-up tables, or for storing video frames during motion compensation steps), or, alternatively, by means of a set of instructions stored in a computer-readable medium, said instructions replacing at least a portion of said circuits and being executable under the control of a computer or a digital processor in order to carry out the same functions as fulfilled in said replaced circuits.

The invention therefore also relates to a computer-readable medium comprising a software module which includes computer executable instructions for performing the steps, or some steps, of the method described above.

The invention claimed is:

1. A method of modifying data for obtaining a scalable video signal from a non-scalable video signal, said scalable video signal being composed of a base video signal and a set of enhancement video signals, characterized in that said method comprises: a set of attenuation steps applied to coefficients composing said non-scalable video signal, said attenuation steps being assembled in series for delivering said base video signal, a re-encoding step associated with each one of said attenuation steps for re-encoding a coding error resulting from each attenuation step and delivering one of said enhancement video signal.

2. A method of modifying data as claimed in claim 1, characterized in that said attenuation step consists of a uniform or a non-uniform frequency weighting of said coefficients performed at the block level.

3. A method of modifying data as claimed in claim 2, characterized in that each re-encoding step comprises a subtracting sub-step between the input and output signals of the associated attenuation step for delivering said coding error, and a variable length coding sub-step for delivering said enhancement video signal from said coding error.

4. A method of modifying data as claimed in claim 3 characterized in that at least one attenuation step consists of a transcoding step.

5. A method of modifying data as claimed in claim 1, characterized in that said attenuation step consists of a uniform or a non-uniform frequency weighting followed in series by a uniform quantization of said coefficients, performed at the block level.

6. A method of modifying data as claimed in claim 5, characterized in that each re-encoding step comprises a subtracting sub-step between the inverse quantized input and output signals of the associated attenuation step for delivering said coding error, and a variable length coding sub-step for delivering said enhancement video signal from said coding error.

7. A set-top box product receiving a non-scalable video signal coded in accordance with the MPLG-2 video standard for generating a scalable video signal, said scalable video signal being composed of a base video signal and a set of enhancement video signals, said set-top box product comprising means for implementing steps of the method as claimed in claim 1.

8. The method of claim 1 further comprising storing said re-encoded video signal onto a storage medium.

9. A computer readable storage medium containing indicia of instructions for a computer to perform a method comprising code instructions for implementing the steps of the methods as claimed in claim 1.

10. A method of transmitting an input video signal coded in accordance with the MPEG-2 video standard after processing through communication channels having different bandwidth capacities, the method comprising associating a variable number of enhancement video signals with a base video signal in accordance with the steps of the method as claimed in claim 1.

11. A method of modifying data for obtaining a scalable video signal from a non-scalable video signal, said scalable video signal being composed of a base video signal and a set of enhancement video signals, characterized in that said method comprises: a set of attenuation steps assembled in cascade, the attenuation step of a higher level in the cascade being applied to coefficients composing said non-scalable video signal for delivering said base video signal, a re-encoding step associated with each one of said attenuation steps for re-encoding a coding error resulting from each attenuation step and delivering one of said enhancement video signal.

12. A product for modifying data for obtaining a scalable video signal from a non-scalable video signal, said scalable video signal being composed of a base video signal and a set of enhancement video signals, characterized in that said product comprises: a set of attenuation means applied to coefficients composing said non-scalable video signal, said attenuation means being assembled in series for delivering said base video signal, re-encoding means associated with each one of said attenuation means for re-encoding a coding error resulting from each attenuation step and delivering one of said enhancement video signal.

13. A product for modifying data for obtaining a scalable video signal from a non-scalable video signal, said scalable video signal being composed of a base video signal and a set of enhancement video signals, characterized in that said product comprises: a set of attenuation means assembled in cascade, attenuation means of a higher level in the cascade being applied to coefficients composing said non-scalable video signal for delivering said base video signal, re-encoding means associated with each one of said attenuation means for re-encoding a coding error resulting from each attenuation step and delivering one of said enhancement video signal.

* * * * *